United States Patent [19]

Zaino

[11] 4,334,947
[45] Jun. 15, 1982

[54] PRESS APPARATUS

[76] Inventor: Richard J. Zaino, 3280 McCorkle Rd., Memphis, Tenn. 38116

[21] Appl. No.: 197,623

[22] Filed: Oct. 16, 1980

[51] Int. Cl.³ ............................................. B29C 17/00
[52] U.S. Cl. ................................... 156/486; 156/216; 156/492; 156/499
[58] Field of Search ........ 156/216, 443, 468, 475–481, 156/486–492, 499

[56] References Cited

U.S. PATENT DOCUMENTS

3,009,201 11/1961 Hansen ........................... 156/486 X
3,028,275 4/1962 Peterson et al. .................... 156/486
4,035,224 7/1977 Anderson ............................ 156/475

Primary Examiner—David A. Simmons
Attorney, Agent, or Firm—Walker & McKenzie

[57] ABSTRACT

An apparatus for pressing the edge of a laminate plastic sheet member against the edge of a base member causing the sheet member to adhere to the base member. A roller is rolled around the edge of the base member with the edge of the sheet member sandwiched therebetween thereby causing the edge of the sheet member to be rolled around the edge of the base member.

4 Claims, 12 Drawing Figures

PRESS APPARATUS

BACKGROUND OF THE INVENTION

1. Field of the Invention

The present invention relates in general to devices for use in the fabrication of laminated plastic countertops and the like.

2. Description of the Prior Art

Heretofore, various devices have been developed that relate in general to the present invention. See, for example, Peterson, U.S. Pat. Nos. 2,937,689; Bartron, 3,392,074; Gepkens, 3,616,076; Evans, 3,668,033; and Anderson, 4,035,224. None of the above patents disclose or suggest the present invention.

SUMMARY OF THE INVENTION

The present invention is directed towards providing an apparatus that will cause a sheet member to extend completely around the edge of a base member. The concept of the present invention is to use a roller to roll the sheet member around the edge of the base member.

The apparatus of the present invention, includes, in general, a bed means for securely holding a base member and a roller means for rolling the edge of a sheet member around the edge of the base member as the base member is securely held by the bed means.

DESCRIPTION OF THE PREFERRED EMBODIMENT

The apparatus 11 of the present invention is for use in applying a sheet member 13 such as a laminate plastic sheet member or the like to a base member 15 such as particle board or the like during the construction of a kitchen countertop or the like. More specifically, the apparatus 11 is for use in bending one edge 17 of the sheet member 13 around one edge 19 of the base member 15 (see, in general, FIGS. 2, 3, 10 and 11). The edge 19 of the base member 15 may be of various sizes but preferably has a rounded face surface beginning at a top or upper radius point 19' and terminating at a bottom or lower radius point 19" that are substantially 180° apart (see, in general, FIGS. 10 and 11). The apparatus 11 includes, in general, a bed means 21 for securely holding the base member 15 and a roller means 23 for rolling the sheet member 13 around the edge 19 of the base member 15 as the base member 15 is securely held by the bed means 21.

Figure 1:
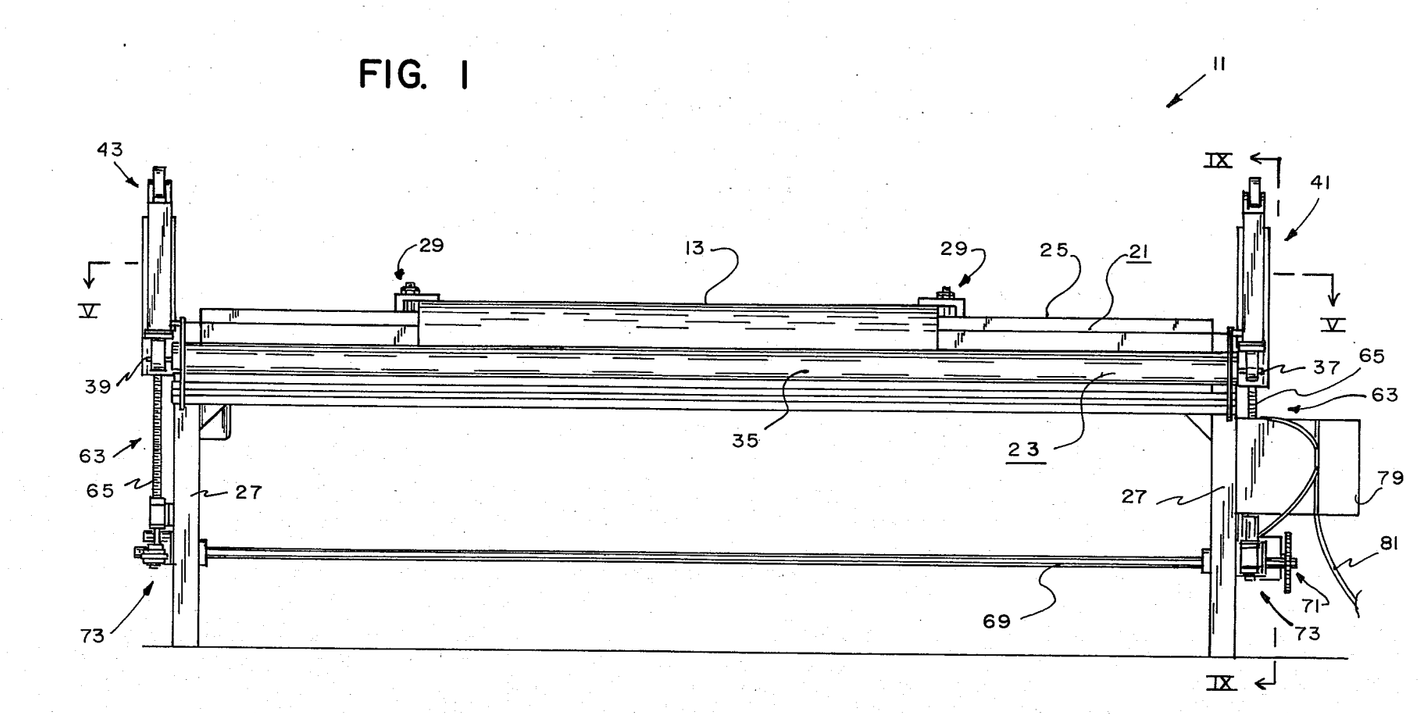
FIG. 1 is a front elevational view of the press apparatus of the present invention with certain portions thereof broken away for clarity.
Figure 7:
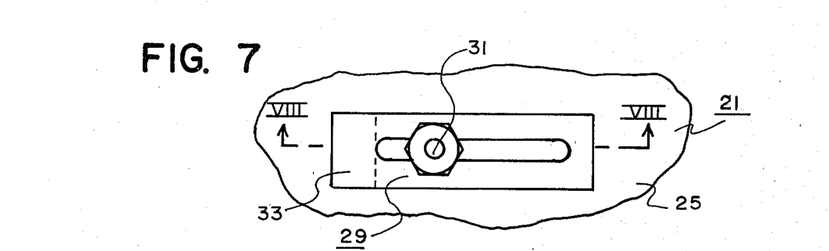
FIG. 7 is a top plan view of a portion of the press apparatus of the present invention.
Figure 8:
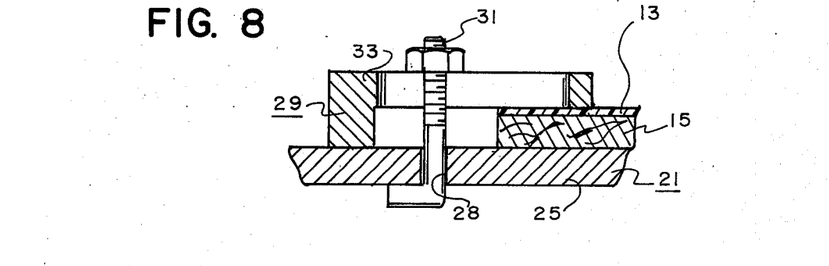
FIG. 8 is a sectional view as taken on line VIII—VIII of FIG. 7.

The bed means 21 preferably includes a tablelike member having a substantially flat, elongated top 25 for receiving the base member 15 and having legs 27 for positioning the top 25 above a supporting surface such as the floor of a building (see, in general, FIG. 1). The top 25 may be provided with a plurality of apertures 28 therethrough (see FIG. 4) for allowing the base member 15 to be easily and properly clamped thereto. That is, the bed means 21 may include a plurality of clamp means 29 for securely clamping the base member 15 and sheet member 13 to the top 25. The clamp means 29 may be of any well-known construction apparent to those skilled in the art that will securely hold base members 15 of different thicknesses to the top 25. For example, each clamp means 29 may include a bolt member 31 that extends through the selected ones of the apertures 28 in the top 25 and a coacting arm member 33 for engaging the base member 15 and sheet member 13 in a manner as will now be apparent to those skilled in the art from FIGS. 7 and 8. The clamp means 29 are preferably movable on the top 25 to any one of the plurality of apertures 28 so as to accommodate base members 15 of different lengths, widths and shapes, etc.

Figure 4:
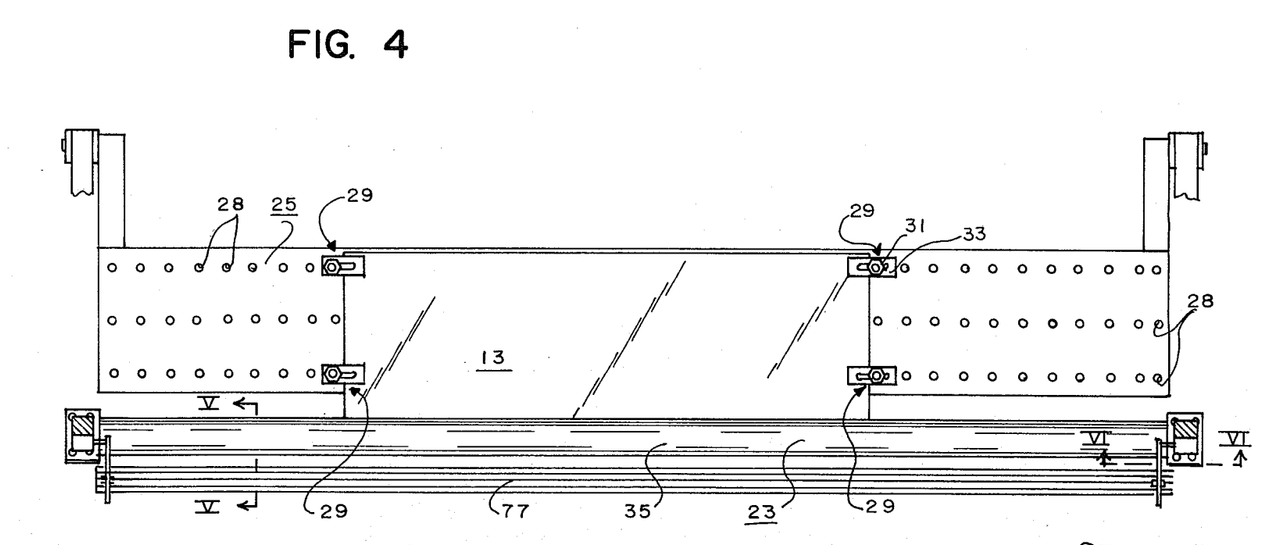
FIG. 4 is a top plan view thereof with portions broken away for clarity.
Figure 5:
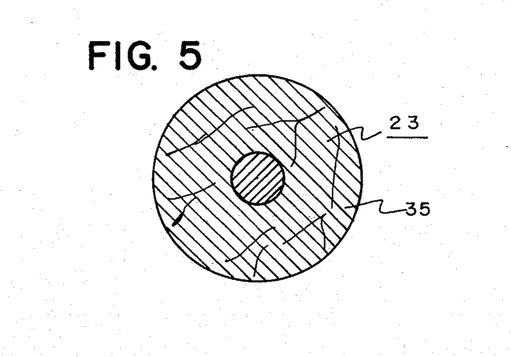
FIG. 5 is an enlarged sectional view as taken on line V—V of FIG. 4.
Figure 6:
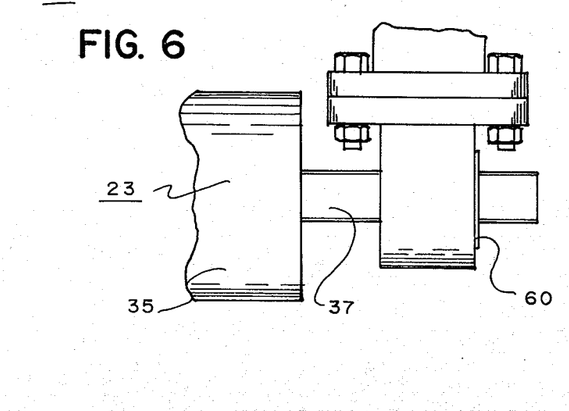
FIG. 6 is an enlarged sectional view as taken on line VI—VI of FIG. 4.

The roller means 23 preferably consists simply of an elongated cylinder 35 that extends from one end of the top 25 to the other end thereof (see, in general, FIGS. 1 and 4). The cylinder 35 may be constructed of some substantially hard material such as any substantially hard wood like, for example, maple and may have a diameter of substantially 5½" (13.97 centimeters). The cylinder 35 has a first end 37 and a second end 39 for being pivotally mounted with respect to the bed means 21 in a manner which will hereinafter be described. The first and second ends 37, 39 of the cylinder 35 may be of a reduced diameter.

The apparatus 11 preferably includes a drive means for causing the roller means 23 to roll around the edge 19 of the base member 15. The drive means preferably includes a pressure-applying means for forcing the roller means 23 against the edge 19 of the base means 15 as the roller means 23 rolls around the edge 19 of the base member 15. The drive means preferably includes first and second arm means 41, 43 for pivotally securing the first and second ends 37, 39 respectfully of the cylinder 35 of the roller means 23 with respect to the bed means 21. Each arm means 41, 43 preferably includes a first arm member 45 having a first end 47 and a second end 49 and preferably includes a second arm member 51 having a first end 53 and a second end 55. The first end 47 of the first arm member 45 of the first and second arm means 41, 43 is pivotally mounted with respect to the bed means 21 as at the pivot 57 (see, in general, FIGS. 2 and 3). The second end 49 of the first arm member 45 of the first and second means 41, 43 is pivotally attached to the second arm member 51 of the first and second arm means 41, 43 intermediate the first and second ends 53, 55 thereof as at the pivot 59 (see, in general, FIGS. 2 and 3). The first end 37 of the cylinder 35 of the roller means 23 is rotatably attached to the second end 55 of the second arm member 51 of the first arm member 41. The second end 39 of the cylinder 35 of the roller means 23 is rotatably attached to the second end 55 of the second arm member 51 of the second arm means 43. The second ends 55 of the second arm members 51 of the first and second arm means 41, 43 preferably are provided with bearings 60 or the like to pivotally receive the first and second ends 37, 39 of the cylinder 35.

Figure 9:
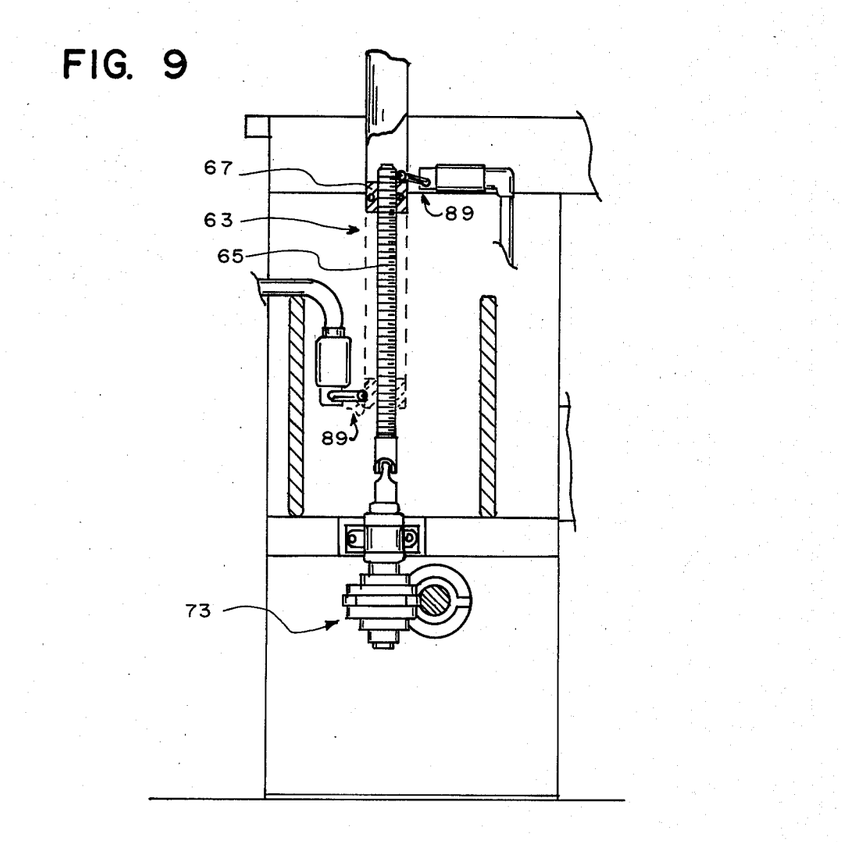
FIG. 9 is a sectional view as taken on line IX—IX of FIG. 1.

The drive means also includes a motor means such as an electric motor 51 and includes a pair of screw means 63 for being driven by the electric motor 61 and for raising and lowering the first and second arm means 41, 43 respectfully (see, in general, FIG. 1). For example, each screw means 63 preferably includes an externally threaded screw rod 65 for being rotated by the electric motor 51 in any manner apparent to those skilled in the art and preferably includes an internally threaded body member 67 for coacting with the threaded rod 65 (see, in general, FIG. 9). The body member 67 is pivotally attached to the first arm member 45 of the arm means 41, 43 substantially intermediate the first and second ends 47, 49 as at pivot 68 thereof whereby rotation of the screw rod 65 will cause the body member 67 to raise and lower the arm member 45 and, therefore, the roller means 23 (see, in general, FIGS. 2 and 3). The electric motor 61 may cause the screw rods 65 to rotate in any manner apparent to those skilled in the art. For example, the electric motor 61 may transfer rotation to a shaft member 69 by way of a chain-and-sprocket mechanism 71 and the shaft member 69 may transfer rotation to the screw rod 65 by way of any typical gear transfer means 73 as will now be apparent to those skilled in the art. The shaft 69 preferably extends completely between the two legs 27 of base member 15 and a gear transfer means 73 is associated with the screw rod 65 of each screw means 63 so that the electric motor 61 will raise or lower both the first and second arm means 41, 43 equally and simultaneously. The pressure-applying means of the drive means preferably consists of pneumatic piston means 75 positioned between the first and second arm members 45, 51 of each arm means 41, 43 for causing the roller means 23 to be held against the edge 19 of the base member 15 with the edge 17 of the sheet member 13 sandwiched therebetween as the screw means 63 raises and lowers the first arm member 45.

The apparatus 11 preferably includes heat means 77 for heating the edge 17 of the sheet member 13 as it is held by the bed means 21. The heat means 77 is used to soften the laminated plastic sheet member 13 before it is rolled around the edge 19 of the base means 15 and may be of various constructions and types known to those skilled in the art. For example, the heat means 77 may be of the type and construction disclosed as the heater 179 in Anderson, U.S. Pat. No. 4,035,224. The heat means 77 may be attached to the second arm members 51 of the first and second arm means 41, 43 for movement therewith.

The operation and use of the apparatus 11 is quite simple. First, the sheet member 13 and base member 15 are secured to the top 25 of the bed means 21 with the portions of the sheet member 13 and base member 15 excluding the edges 17, 19 adhered to one another in any typical manner. The heat means 77 is then activated to heat the edge 17 of the sheet member 13. Glue or other adhesive can be manually applied to the edge 19 of the base member 15. Once the edge 17 of the sheet member 13 has been softened by the heat means 77, the piston means 75 can be activated to force the roller means 23 against the edge 17 of the sheet member 13 and the electric motor 61 can be activated to cause the roller means 23 to roll completely around the edge 19 of the base member 15 with the edge 17 of the sheet member 13 sandwiched therebetween thereby causing the edge 17 of the sheet member 13 to extend completely around and be adhered to the edge 19 of the base member 15. The specific manner in which the heat means 77, piston means 75 and electric motor 61 are activated may vary as will now be apparent to those skilled in the art. For example, an electric switch master control means 79 may be provided for selectively providing electrical energy to the heat means 77 and electric motor 61. That is, an electrical wire 81 (see FIG. 1) extends from any typical source of electrical energy (not shown) such as a wall outlet or the like to the electrical switch master control means 79. The electrical switch master control means 79 includes various switches for controlling the flow of electrical energy from the electrical wire 81 to the heat means 77 and electric motor 61 through various electrical wires 83 (see, in general, FIGS. 2 and 3) as will now be apparent to those skilled in the art. The electrical switch master control means 77 may include a master switch, an electric motor speed control switch, an electric motor forward/reverse switch, and an electric motor start/stop switch, etc. A timer 85 and a time delay switch 87 may be interposed between the electrical switch master control means 79 and the heat means 77. Automatic cut-off switches 89 may be interposed in the electrical wiring for automatically cutting-off the electric motor 61 and/or heat means 77 if the screw means 63 moves to pre-set limits.

Figure 2:
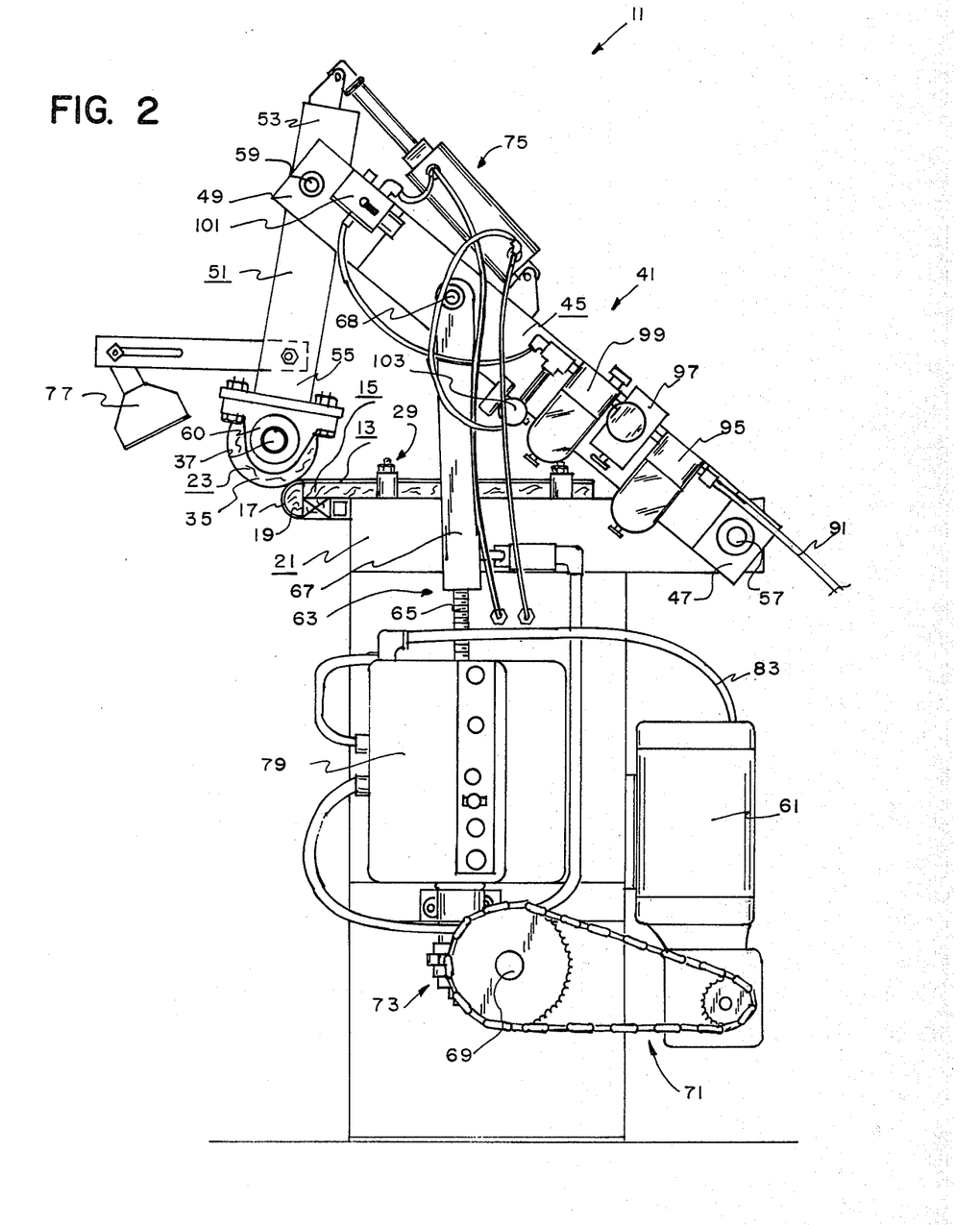
FIG. 2 is an enlarged right side elevational view thereof with certain portions thereof moved or broken away for clarity.
Figure 3:
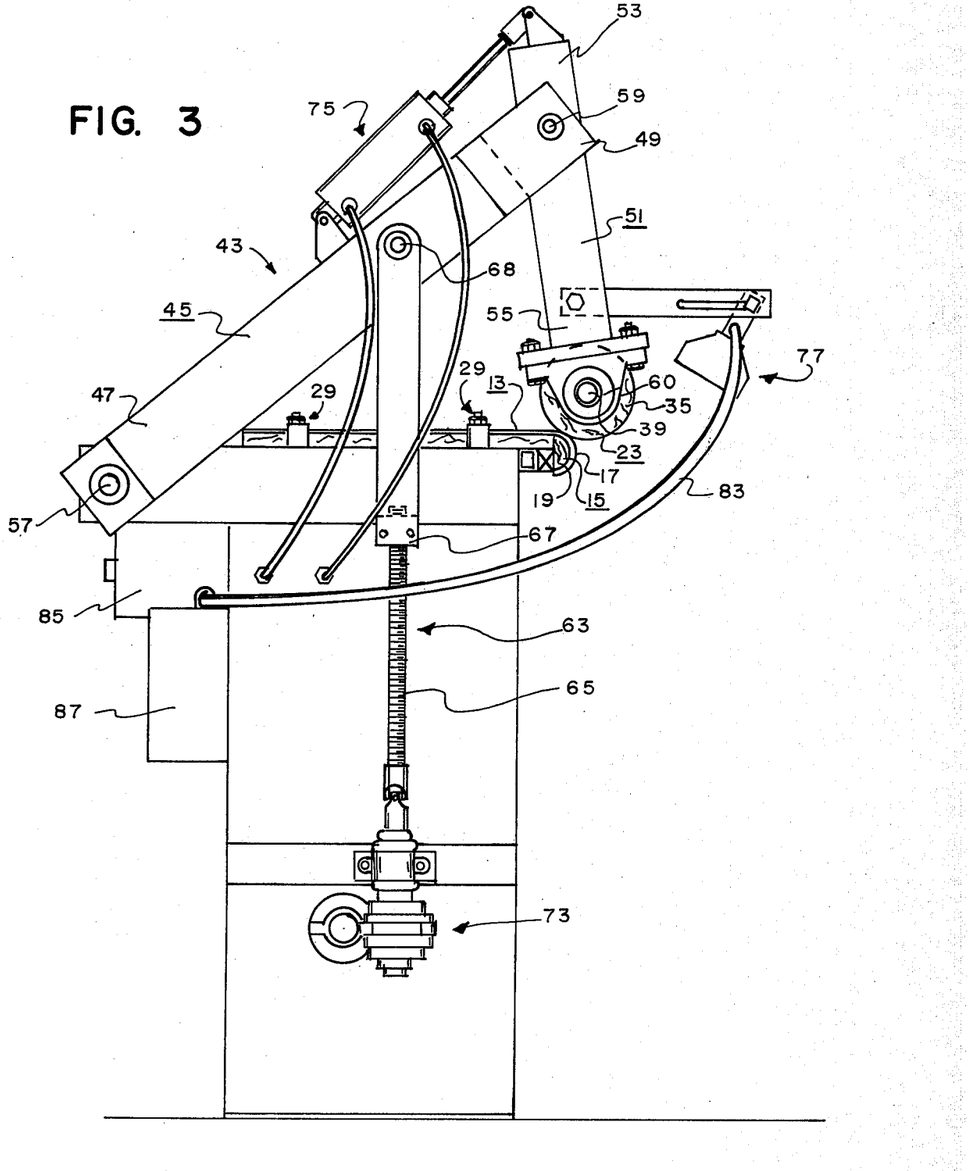
FIG. 3 is an enlarged left side elevational view therof with certain portions thereof moved or broken away for clarity.
Figure 10:
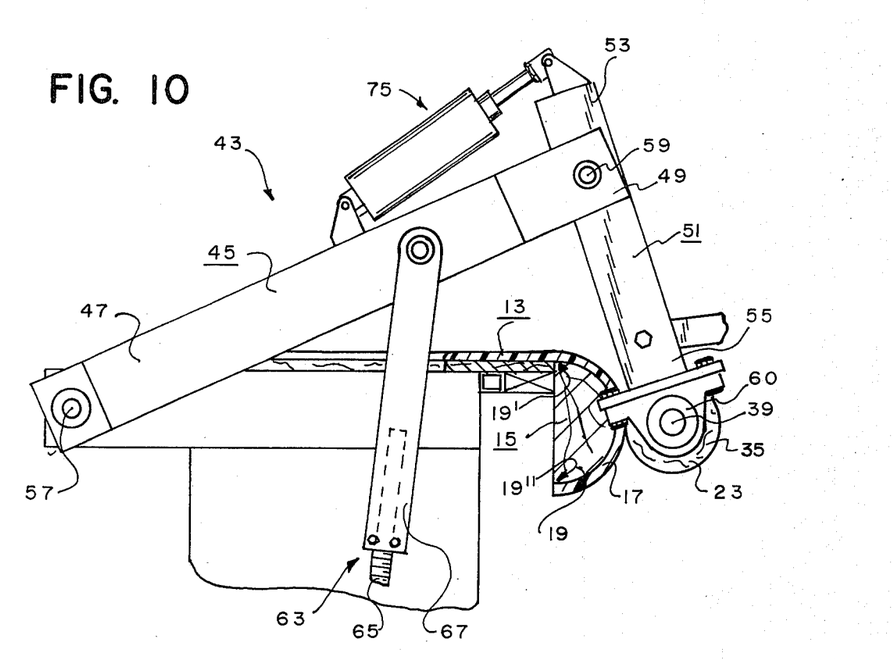
FIG. 10 is a somewhat diagrammatic side elevational view of the press apparatus of the present invention somewhat similar to FIG. 3 but with portions thereof moved or broken away for clarity.
Figure 11:
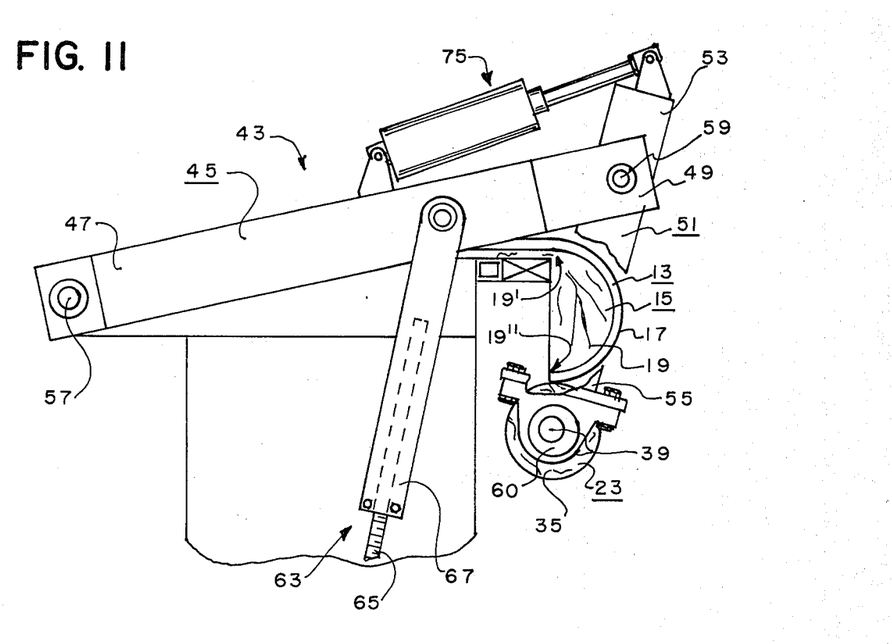
FIG. 11 is a side elevational view similar to FIG. 10 but with portions thereof in moved positions.
Figure 12:
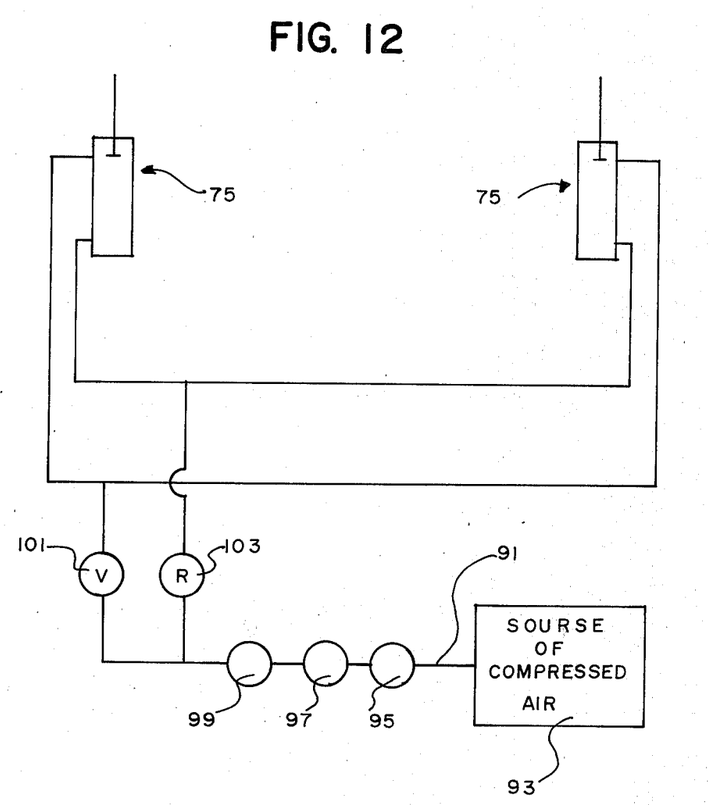
FIG. 12 is a somewhat schematic view of the compressed air system of the press apparatus of the present invention.

The piston means 75 may be controlled by compressed air in any manner now apparent to those skilled in the art. For example, a hose 91 may extend from any typical source of compressed air 93 such as a standard air compressor or the like to the piston means 75 through various valves, regulators, and the like whereby the piston means 75 can be controlled by an even, constant pressure. More specifically, the apparatus 11 may include an oiler 95, a pressure regulator 97, and a water trap 99 to add oil to the compressed air passing to the piston means 75, to control the pressure of the compressed air passing to the piston means 75, and to remove any water from the compressed air passing to the piston means 75, respectively (see FIG. 12). The construction and operation of the oiler 95, pressure regulator 97 and water trap 99 is well-known to those skilled in the art. The retraction and extension of the piston means 75 can be manually controlled by a standard, well-known valve 101 which when open will allow compressed air from the source 93 of compressed air to cause the piston means 75 to close or retract as will be apparent to those skilled in the art from FIG. 12. A standard, well-known pressure regulator 103 may be included to allow the pressure of the compressed air forcing the piston means 75 to the extending position to be controlled as will be apparent to those skilled in the art from FIG. 12. The piston means 75 are therefore variable so as to allow the apparatus 11 to be used with base members 15 having edges 19 of different thicknesses (see, for example, the different thickness of the edge 19 of the base member 15 shown in FIGS. 2 and 3 compared to the edge of the base member 15 shown in FIGS. 10 and 11). More specifically, the pressure regulator 103 will cause the piston means 75 to exert a constant force against the roller means 23 through the arm means 41, 43 regardless of the thickness of the edge 19 of the base member 15. Thus, with the valve 101 closed, the piston means 75 will extend, causing the roller means 23 to be forced toward the edge 19 of the base member 15. Assuming that the screw means 63 is positioned so as to hold the arm means 41, 43 in a raised position, the motor 61 is activated to turn the screw rod 63 so as to lower the arm means 41, 43 and cause the roller means 23 to initially touch the sheet member 13 at a point substantially directly above the upper radius point 19' of the edge 19 of the base member 15 substantially as shown in FIGS. 2 and 3. Once the edge 17 of the sheet member 13 has been sufficiently heated by the heat means 77, the motor 61 is again activated to turn the screw rod 63 so to further lower the arm means 41, 43 and cause the roller means 23 to roll completely around the edge 19 of the base member 15 as shown in FIG. 10 until it reaches the bottom radius point 19" of the edge 19 of the base member 15 as shown in FIG. 11. The valve 101 can then be opened to allow compressed air from the source 93 thereof to move the piston means 75 to the retracted position thereby causing the arm means 41, 43 to simultaneously move the roller means 23 away from the edges 17, 19 of the members 13, 15. The base member 15, with the sheet member 13 adhered thereto, can then be removed from the apparatus 11, preferably after the sheet member 13 has been cooled by, for example, being sprayed with compressed air from the source 93 thereof.

Although the invention has been described and illustrated with respect to a preferred embodiment thereof, it is not to be so limited since changes and modifications may be made therein which are within the full intended scope of the invention.

I claim:

1. An apparatus for causing a sheet member to extend around the edge of a base member, said apparatus comprising:
   (a) a bed means for securely holding said base member;
   (b) roller means for rolling said sheet member around said edge of said base member as said base member is securely held by said bed means; and
   (c) drive means for causing said roller means to roll around said edge of said base member, said drive means including piston means for forcing said roller means against said edge of said base member as said roller means rolls around said edge of said base member, including a pressure regulator for controlling the extension of said piston means and for causing said drive means to be variable for allowing said apparatus to be used with base members of different thicknesses.

2. An apparatus for causing one edge of a laminate plastic sheet member to extend completely around one edge of a base member, said apparatus comprising:
   (a) a bed means for securely holding said sheet member and said base member, said bed means including clamp means for fixedly clamping said sheet member and said base member to said bed means with said one edge of said sheet member extending past said one edge of said base member;
   (b) heat means for heating said one edge of said sheet member as said sheet member securely held by said bed means;
   (c) roller means for rolling said one edge of said sheet member completely around said one edge of said base member as said sheet member and said base member are securely held by said bed means; and
   (d) drive means for causing said roller means to roll around said one edge of said base member, said drive means including pressure-applying means for forcing said roller means against said one edge of said base member with said one edge of said sheet member sandwiched therebetween as said roller means rolls around said one edge of said base member, said drive means being variable for allowing said apparatus to be used with base members of different thicknesses, said drive means including an arm means for pivotally securing said roller means with respect to said bed means, including a motor means, and including a screw means for being driven by said motor means and for raising and lowering said arm means.

3. The apparatus of claim 2 in which said arm means includes a first arm member having a first end and a second end and includes a second arm member having a first end and a second end, said first end of said first arm member being pivotally mounted with respect to said bed means, said second end of said first arm member being pivotally attached to said first end of said second arm member, said roller means being rotatably attached to said second end of said second arm member.

4. The apparatus of claim 3 in which said screw means is attached to said first arm member for raising and lowering said first arm member, and in which said pressure-applying means includes a pneumatic piston means positioned between said first and second arm members for causing said roller means to be held against said one edge of said base member with said one edge of said sheet member sandwiched therebetween as said screw means raises and lowers said first arm member.

* * * * *